(12) United States Patent
Luan et al.

(10) Patent No.: US 10,353,747 B2
(45) Date of Patent: Jul. 16, 2019

(54) SHARED MEMORY CONTROLLER AND METHOD OF USING SAME

(71) Applicant: Futurewei Technologies, Inc., Plano, TX (US)

(72) Inventors: Hao Luan, Plano, TX (US); Alan Gatherer, Richardson, TX (US); Bin Yang, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 431 days.

(21) Appl. No.: 14/797,620

(22) Filed: Jul. 13, 2015

(65) Prior Publication Data
US 2017/0017412 A1    Jan. 19, 2017

(51) Int. Cl.
*G06F 12/00* (2006.01)
*G06F 9/52* (2006.01)
(Continued)

(52) U.S. Cl.
CPC ............... *G06F 9/52* (2013.01); *G06F 3/064* (2013.01); *G06F 3/0613* (2013.01);
(Continued)

(58) Field of Classification Search
CPC ..... G06F 9/52; G06F 13/1663; G06F 12/0815
See application file for complete search history.

(56) References Cited

U.S. PATENT DOCUMENTS 5,404,553 A * 4/1995 Komori ................ G06F 9/3004
                                                                712/25
5,881,314 A     3/1999 Chung
(Continued)

FOREIGN PATENT DOCUMENTS

CN    1152146 A    6/1997
CN    1348564 A    5/2002
(Continued)

OTHER PUBLICATIONS

International Search Report dated Sep. 14, 2016, International Application No. PCT/CN2016/085754 filed Jun. 14, 2016, by Huawei Technologies Co., Ltd., 4 pages.
(Continued)

*Primary Examiner* — Prasith Thammavong
(74) *Attorney, Agent, or Firm* — Vierra Magen Marcus LLP

(57) ABSTRACT

A controller for a shared memory is disclosed. The controller comprises a transaction scanner configured to scan-in a plurality of transactions to access the shared memory and to divide the transactions into beat-level memory access commands. The controller also comprises a command super-arbiter comprising a plurality of command arbiters corresponding to a plurality of shared memory blocks in the shared memory. The command super-arbiter is configured to access a quality of service for each of the transactions, arbitrate the beat-level memory access commands associated with the transactions based on the quality of service for each of the plurality of transactions, and dispatch the beat-level memory access commands to the shared memory blocks based on results of arbitrating the beat-level memory access commands.

20 Claims, 9 Drawing Sheets

(51) Int. Cl.
*G06F 3/06* (2006.01)
*G06F 13/16* (2006.01)
*G06F 12/0815* (2016.01)

(52) U.S. Cl.
CPC .......... *G06F 3/0659* (2013.01); *G06F 3/0673* (2013.01); *G06F 13/1663* (2013.01); *G06F 12/0815* (2013.01)

(56) References Cited

U.S. PATENT DOCUMENTS

| | | | |
|---|---|---|---|
| 6,209,066 B1* | 3/2001 | Holzle | G06F 9/4862 |
| | | | 711/153 |
| 6,430,642 B1 | 8/2002 | Stracovsky et al. | |
| 7,356,671 B1 | 4/2008 | Wei | |
| 8,095,932 B2 | 1/2012 | Merten et al. | |
| 8,607,022 B2 | 12/2013 | Balkan et al. | |
| 8,612,648 B1 | 12/2013 | Murray | |
| 8,793,420 B2 | 7/2014 | Roh | |
| 8,943,249 B2 | 1/2015 | Kwon et al. | |
| 9,098,203 B1* | 8/2015 | Kedem | G06F 3/061 |
| 2001/0056515 A1* | 12/2001 | Jacobs | G06F 13/364 |
| | | | 710/240 |
| 2004/0017825 A1* | 1/2004 | Stanwood | H04W 72/1236 |
| | | | 370/468 |
| 2005/0251639 A1 | 11/2005 | Vishin et al. | |
| 2006/0285377 A1 | 12/2006 | Purcell et al. | |
| 2007/0038792 A1 | 2/2007 | Shin | |
| 2007/0041364 A1* | 2/2007 | Kakadia | H04L 45/00 |
| | | | 370/352 |
| 2008/0040554 A1 | 2/2008 | Zhao et al. | |
| 2008/0098151 A1 | 4/2008 | Purcell et al. | |
| 2008/0253387 A1* | 10/2008 | Liang | H04L 1/1877 |
| | | | 370/412 |
| 2009/0204771 A1* | 8/2009 | Kawamoto | G06F 13/1663 |
| | | | 711/151 |
| 2009/0287865 A1 | 11/2009 | Aldworth et al. | |
| 2011/0066768 A1 | 3/2011 | Brittner et al. | |
| 2011/0277001 A1* | 11/2011 | Kaluskar | H04L 12/2818 |
| | | | 725/80 |
| 2011/0302336 A1* | 12/2011 | Naylor | G06F 13/1626 |
| | | | 710/35 |
| 2012/0079155 A1* | 3/2012 | Damodaran | H03K 19/0016 |
| | | | 710/244 |
| 2013/0013879 A1 | 1/2013 | Yamada et al. | |
| 2013/0054896 A1* | 2/2013 | Colavin | G06F 12/084 |
| | | | 711/118 |
| 2013/0268706 A1 | 10/2013 | Yun et al. | |
| 2014/0143486 A1 | 5/2014 | Kai et al. | |
| 2014/0325153 A1* | 10/2014 | Huang | G06F 12/0607 |
| | | | 711/122 |
| 2016/0103769 A1* | 4/2016 | Glickman | G06F 12/1081 |
| | | | 711/6 |
| 2016/0117223 A1* | 4/2016 | Mnich | G06F 3/0619 |
| | | | 714/764 |

FOREIGN PATENT DOCUMENTS

| | | |
|---|---|---|
| CN | 1366248 A | 8/2002 |
| CN | 1752916 A | 3/2006 |
| CN | 101187908 A | 5/2008 |
| CN | 101341474 A | 1/2009 |
| CN | 101495975 A | 7/2009 |
| CN | 102609312 A | 7/2012 |
| CN | 103377154 A | 10/2013 |
| JP | 2007048274 A | 2/2007 |
| JP | 2009193107 A | 8/2009 |
| WO | 9611440 A1 | 4/1996 |
| WO | 2007071889 A1 | 6/2007 |

OTHER PUBLICATIONS

English Abstract of Chinese Patent Publication No. CN103377154 published Oct. 30, 2013.
English Abstract of Chinese Patent Publication No. CN102609312 published Jul. 25, 2012.
Jeong et al., "A QoS-Aware Memory Controller for Dynamically Balancing GPU and CPU Bandwidth Use in an MPSoC," Proceedings of the 49th Annual Design Automation Conference, Apr. 2012, 6 pages.
Li, et al., "McPAT: An Integrated Power, Area, and Timing Modeling Framework for Multicore and Manycore Architectures," Micro '09, Dec. 12-16, 2009, 12 pages.
Subramanian, et al., "MISE: Providing Performance Predictability and Improving Fairness in Shared Main Memory Systems," 19th International Symposium on High Performance Computer Architecture, Feb. 2013, 12 pages.
Stevens, "QoS for High-Performance and Power-Efficient HD Multimedia," White Paper, ARM, Apr. 2010, 20 pages.
Stevens, "Quality of Service (QoS) in ARM Systems: An Overview," White Paper, ARM, Jul. 2014, 8 pages.
Notice of Allowance dated Feb. 9, 2016 in U.S. Appl. No. 14/265,127, filed Apr. 29, 2014, 8 pages.
International Search Report and Written Opinion of the International Searching Authority received in Patent Cooperation Treaty Application No. PCT/CN2015/077719 dated Jul. 31, 2015, 12 pages.
European Search Report, Application No. 16823754.3, dated Apr. 25, 2018.
Notice of Rejection dated Feb. 19, 2019, in Japanese Patent Application No. 2018-501260.
Office Action dated Apr. 23, 2019, in Chinese Patent Application No. 201680039765.3, 44 pages.

\* cited by examiner

SHARED MEMORY CONTROLLER AND METHOD OF USING SAME

BACKGROUND

The prevalence of multi-core system-on-a-chip (SoC) is increasing. A typical multi-core SoC includes multiple masters such as processing cores that share a memory space. A master can be a variety of processing devices, such as a microprocessor core, a digital signal processor (DSP), hardware accelerator (HAC), among others. The shared memory can also take a variety of forms, such as flash or dynamic random access memory (DRAM), among others. The shared memory is often divided into multiple physical blocks of memory. Each of the multiple processing cores accesses the shared memory through a shared memory controller. The shared memory controller regulates the flow of data among the various masters and the multiple physical blocks of memory. The shared memory controller is often a bottleneck for SoC performance.

BRIEF SUMMARY

Embodiments disclosed herein provide a shared memory controller and a method of controlling a shared memory.

An embodiment method of controlling a shared memory includes the following. Transactions to access a shared memory are received from masters. The transactions are divided into beat-level memory access commands for the respective transactions. Each of the transactions is divided into at least one beat-level memory access command, and at least one of the transactions is divided into multiple beat-level memory access commands. A quality of service is accessed for each of the transactions. The beat-level memory access commands associated with the transactions are arbitrated based on the quality of service for the respective transactions. The beat-level memory access commands are dispatched to the shared memory based on results of arbitrating the beat-level memory access commands.

An embodiment includes a controller for a shared memory. The controller comprises a transaction scanner configured to scan-in transactions to access the shared memory and to divide the transactions into beat-level memory access commands. Each of the transactions is divisible into at least one beat-level memory access command, and at least one of the transactions is divisible into multiple beat-level memory access commands. The controller also comprises a command super-arbiter comprising a plurality of command arbiters corresponding to a plurality of shared memory blocks in the shared memory. The command super-arbiter is configured to access a quality of service for each of the transactions, arbitrate the beat-level memory access commands associated with the transactions based on the quality of service for each of the plurality of transactions, and dispatch the beat-level memory access commands to the shared memory blocks based on results of arbitrating the beat-level memory access commands.

An embodiment includes a system on a chip (SoC) comprising shared memory blocks, masters configured to generate respective read/write transactions to access the shared memory blocks, and a shared memory controller coupled between the shared memory blocks and the masters. The shared memory controller comprises a transaction scanner and command arbiters corresponding to the shared memory blocks. The transaction scanner is configured to scan-in and divide the read/write transactions into beat-level read/write commands. The transaction scanner is configured to divide at least one of the read/write transactions into multiple beat-level read/write commands. The command arbiters are configured to access a quality of service for each of the read/write transactions and to arbitrate the beat-level read/write commands associated with the read/write transactions based on the quality of service for each of the read/write transactions, yielding sequences of beat-level read/write commands corresponding to the respective shared memory blocks. The command arbiters are further configured to dispatch the sequences of beat-level read/write commands to the respective shared memory blocks.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

DETAILED DESCRIPTION OF ILLUSTRATIVE EMBODIMENTS

Figure 1:
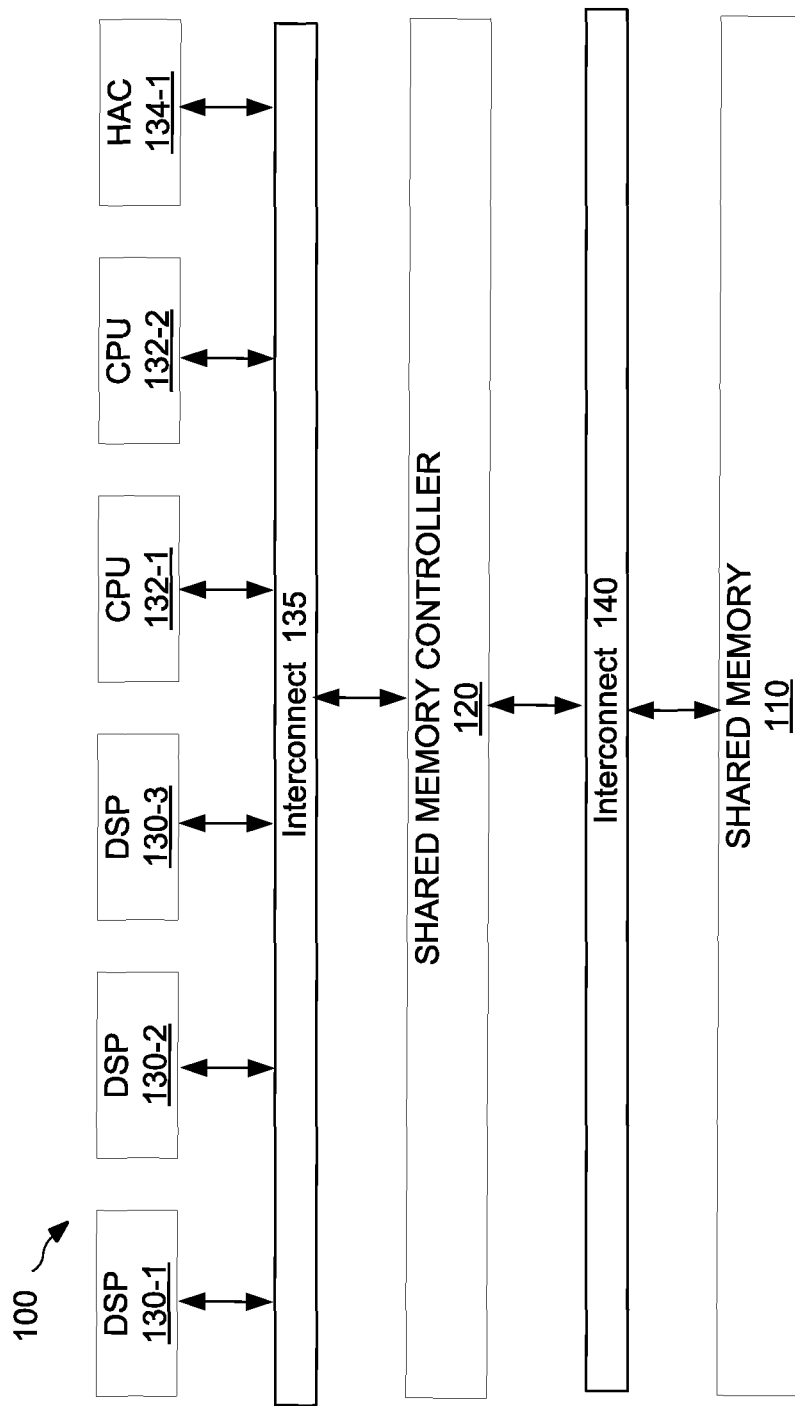
FIG. 1 is a block diagram of one embodiment of a SoC within which a shared memory controller or method of controlling shared memory may be embodied or carried out.

The present disclosure, generally described, relates to technology for accessing a shared memory. On a typical SoC having at least one master (such as a processor), a shared memory and a shared memory controller, the master accesses the shared memory via transaction. The transaction may be a memory access command, such as a read command or a write command. The master generates a read command or a write command and sends it to the shared memory controller. The term read/write command will be used herein to refer to a command that is either a read command or a write command. If limited to a single processing core, a read/write command is simply executed and the memory accessed. In a multi-core SoC, each of the cores can simultaneously generate read/write commands, each corresponding to a transaction. The multiple read/write commands are arbitrated to determine which is to be carried out and when.

One transaction aims to either read or write some amount of data from or to the shared memory. The amount of data that can be read from or written to a given physical block of memory in a given clock cycle generally is limited by the size of the bus that couples the shared memory to the SoC. If the bus is eight bits wide, then a maximum of eight bits (one byte) can be written to the given physical block of memory per clock cycle. Likewise, if the bus is 32 bits wide, then the maximum is 32 bits (four bytes). Each transaction can be divided into smaller portions to suit the bus width. Each of these smaller portions is referred to as a beat, which may have a size to match the bus width. For example, on a SoC having an eight bit bus width to the shared memory, a transaction to read or write 64 bits of data to the shared memory would be divided into eight beats, each beat having a size of eight bits. Each beat of a transaction can be independently addressed, which means a given transaction can cause data to be read from or written to one or more physical blocks of memory. Blocks of memory can be addressed absolutely, or can be addressed by a memory block number and an offset within the block. Additionally, certain types of memory can handle multiple simultaneous read and write commands, while others can handle only one read or write command, and others can handle only one read and one write.

A typical shared memory controller relies on a switching fabric to regulate the flow of read/write commands and data among the multiple masters, the shared memory controller, and the shared memory. Some conventional switching fabrics arbitrate traffic generated by multiple masters at a transaction level granularity, which degrades the performance of multi-core SoCs, particularly the read and write access latencies. First one transaction is allowed to access the shared memory, then another transaction is allowed through the switching fabric to access the shared memory. As mentioned above, on a multi-core SoC, multiple transactions can arrive at the switching fabric simultaneously. For example, assume another transaction of 32 bits arrives concurrently with the 64 bit transaction above. Also assume the 64 bit transaction is higher priority. In that case, the 32 bit transaction waits for the 64 bit transaction to complete before it is dispatched to the shared memory.

Some conventional multi-core SoCs utilizing a switching fabric limit the size of arbitration granularity for transactions to reduce memory access latencies. For example, one large high-priority transaction can occupy the shared memory controller for a substantial time, causing high latencies for all other transactions.

Embodiments disclosed herein provide for a shared memory controller configured to concurrently scan-in the active commands from the one or more masters (e.g., processing cores) and perform concurrent beat-level arbitration. Additionally, the shared memory controller can employ interleaved memory that allows concurrent dispatch of beat-level read/write commands to the various physical blocks of memory. In alternative embodiments, the memory can be organized linearly.

The shared memory controller is quality of service (QoS) aware, in some embodiments. A shared memory controller of one embodiment arbitrates beat-level memory access commands based on a QoS of the transaction associated with the beat-level memory access commands. This provides for further performance improvements. For example, for one master it may be more important that a certain portion of the transaction complete as fast as possible, even at the expense of other portions of the transaction being slower to complete. For another master it may be more important that the entire transaction completes as fast as possible. The shared memory controller of certain embodiments selects a beat-level arbitration scheme that is tailored to the needs of the master.

In one embodiment, the shared memory controller is latency aware. The shared memory controller increases a scheduling weight of a beat-level memory access command in response to an increase in the time that the beat-level memory access command waits to be dispatched to the shared memory. This can mitigate memory access starvation.

In one embodiment, the shared memory controller is critical beat aware. The shared memory controller may assign a higher scheduling weight to a beat-level memory access command that is more critical to the transaction. This allows the shared memory controller to be able to return the more critical data to the master faster.

There are many more examples of how the shared memory controller may be (QoS) aware. For example, there may be a timing budget for each of the transactions a master sends to the shared memory controller. The shared memory controller of certain embodiments escalates the scheduling of a beat-level command to help meet the timing budget of the transaction.

In certain embodiments, the shared memory controller is bandwidth aware. For example, the shared memory controller is aware of the bandwidth that is allocated to various types of transactions. The shared memory controller may throttle beat-level memory access commands to help enforce the bandwidth allocations.

FIG. 1 is a block diagram of one embodiment of a SoC 100 within which the shared memory controller or method of controlling shared memory may be embodied or carried out. SoC 100 includes a shared memory 110 coupled to a shared memory controller 120 by an interconnect 140 such as a bus, network (e.g., packet network), etc. SoC 100 also includes DSP 130-1, DSP 130-2, DSP 130-3, CPU 132-1, CPU 132-2 and hardware accelerator (HAC) 134-1, which will be referred to herein as "masters." Alternative embodiments can include any number and type of masters (e.g., processors, processor cores, CPUs, DSPs, and HACs).

The masters communicate with the shared memory controller 120 over interconnect 135. Interconnect 135 may be implemented with one or more busses, one or more networks (such as a packet-switched network), or some combination of busses and networks. The bus width of various busses in interconnect 135 may or may not be the same as the other busses. For example, some busses in the interconnect may be 32 bits wide, whereas others are 64 bits wide. Thus, one master may communicate on a 32-bit bus, whereas another master communicates on a 64-bit bus, as one example. Note that the shared memory controller 120 may be directly connected to one or more of the masters, as one possibility. Interconnect 140 can have a bus that is the same or a different width than the width of busses in interconnect 135. Also, the various busses and networks in interconnects 130 and 140 may observe the same or different protocols. In one embodiment, one or more of the masters are configured with a point-to-point direct connection to the shared memory controller 120. This can help to achieve high performance when using embodiments of beat-level arbitration.

In the embodiment of FIG. 1, shared memory 110, shared memory controller 120, DSPs 130-1 through 130-3, CPU 132-1, CPU 132-2, and HAC 134-1 can be clocked at a common frequency, or can be clocked independently. Also, shared memory 110, shared memory controller 120, DSPs 130-1 through 130-3, CPU 132-1, CPU 132-2, and HAC 134-1 can be clocked synchronously or asynchronously. If clocked synchronously, the clock speeds for shared memory 110 and shared memory controller 120 are proportional to the clock speed for DSPs 130-1 through 130-3, CPU 132-1, CPU 132-2, and HAC 134-1. Additionally, each can be clocked at a different frequency, and with different clock phase if clocked asynchronously. For example, in one embodiment, assume DSPs 130-1 through 130-3 are clocked at a frequency F. Shared memory 110 and shared memory controller 120 may be clocked at ½ F. In another embodiment, shared memory 110 may be clocked at ½ F, while shared memory controller 120 is clocked at ¼ F. The clock speeds for a particular embodiment can be determined to balance performance with power, as over-clocking a device generally wastes power and under-clocking introduces latency.

DSPs 130-1 through 130-3, CPU 132-1, CPU 132-2, and HAC 134-1 each can generate read/write commands that are sent to shared memory controller 120. Each of the commands corresponds to a transaction that will read from or write to shared memory 110 via interconnect 140. In one embodiment, the shared memory controller 120 is configured to concurrently scan-in all active read/write transactions and divide them into beat-level memory access commands. Each read/write transaction may be divided into one or more beat-level memory access commands. For example, a read transaction may be divided into eight beat-level read commands. Shared memory controller 120 is further configured to carry out beat-level arbitration on the beat-level commands. Beat-level arbitration mitigates the chances of having any one transaction experience large latencies. In embodiments where shared memory 110 comprises banks of physical memory, beat-level arbitration further allows concurrent dispatch of beat-level memory access commands to the various banks of physical memory.

The shared memory controller 120 of some embodiments is quality of service (QoS) aware. For example, the shared memory controller 120 is aware of one or more QoS parameters of a master and/or a transaction from the master. QoS parameters could include, but are not limited to, priority, timing budget, and bandwidth allocation.

The shared memory controller 120 is configured to assign a different scheduling weight to different beat-level memory access commands associated with the same transaction, in one embodiment. For example, one of the beat-level memory access commands may be more critical than the others in the given transaction. Assigning that beat-level memory access command a higher or greater scheduling weight allows it to complete faster than the others in that transaction. Moreover, assigning a lower scheduling weight to other beat-level memory access commands in that transaction may prevent or at least reduce the chances of the less critical beat-level memory access commands from blocking a beat-level memory access command from a different transaction.

As another example, the shared memory controller 120 is configured to assign a scheduling weight to a beat-level memory access command based on how many clock cycles it has been waiting to be dispatched to the shared memory 110. The longer that the beat-level memory access command has been waiting, the higher the scheduling weight, in one embodiment. This assures that lower priority beat-level memory access commands will not have to wait for excessive time to be dispatched to the shared memory 110.

In some embodiments, shared memory controller 120 also combines beat-level responses from shared memory 110 into one or more responses for each transaction. For example, given a read transaction that the shared memory controller 120 divides into eight beats, read data is retrieved from various physical memory blocks in shared memory 110 eight times. The shared memory controller 120 may collect each of those eight beat-level read data responses and combine them into a single read data response for the read transaction. Shared memory controller 120 can then return the read data to whichever master commanded the transaction.

However, note that the shared memory controller 120 does not necessarily send back all of the read data contiguously. In some cases, a critical portion of the read data for a given transaction may come back from the shared memory 110 while a less critical portion of the read data for that transaction has not yet been retrieved from the shared memory 110. In such a case, the shared memory controller 120 may package together the read data from less than all of the beat-level responses for the transaction and send that data to the master so that the master receives the most critical data faster. The shared memory controller 120 can then proceed to send the less critical read data associated with the transaction in response to that data being retrieved from the shared memory 110.

In another example, given a write transaction that the shared memory controller breaks into eight beats, acknowledgements may be received from the eight various destination physical memory blocks in shared memory 110. In some embodiments, the shared memory controller 120 collects each of those eight beat-level write responses and combine them into a single write response for the write transaction.

Figure 2:
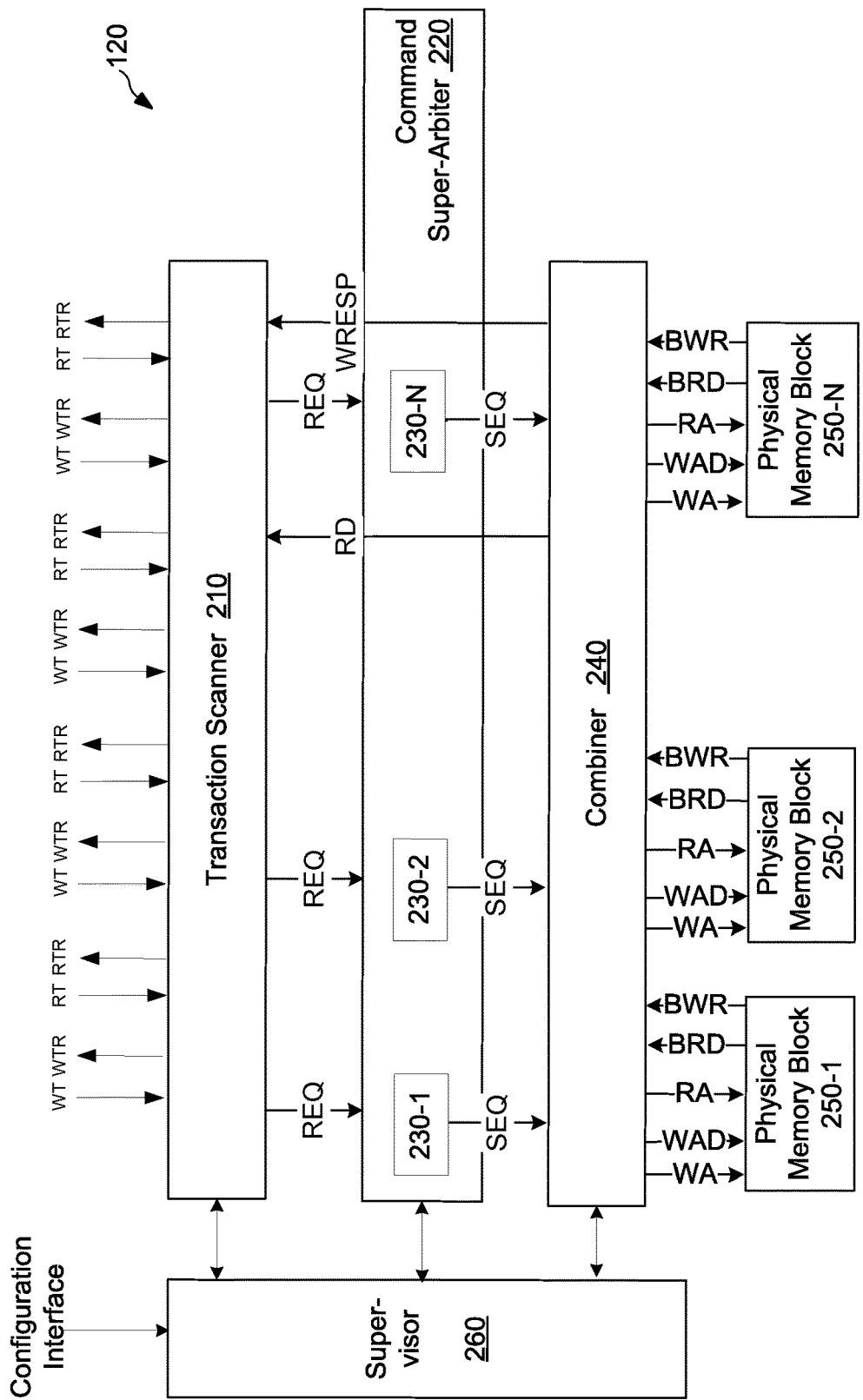
FIG. 2 is a block diagram of one embodiment of shared memory controller of FIG. 1.

FIG. 2 is a block diagram of one embodiment of shared memory controller 120 of FIG. 1. Shared memory controller 120 includes a transaction scanner 210, a command super-arbiter 220, a combiner 240, and a supervisor 260. Shared memory controller 120 is coupled to N physical memory blocks 250-1 through 250-N. Likewise, command super-arbiter 220 includes N command arbiters 230-1 through 230-N that correspond to the N physical memory blocks. In certain embodiments, each of the N command arbiters 230-1 through 230-N includes a separate read arbiter and a separate write arbiter. In one embodiment, a command arbiter 230 performs both read and write arbitrations together. In one embodiment, transaction scanner 210, command super-arbiter 220, combiner 240, and supervisor 260 are implemented with registers and/or combinational logic. However, other implementations can be used.

Transaction scanner 210 is configured to concurrently scan-in all active transactions from the various masters (e.g., processing cores, processors, CPUs, DSPs, HACs, etc.) coupled to shared memory controller 120. Active transactions can include both read transactions (RT) and write transactions (WT) simultaneously. Transaction scanner 210 scans-in the memory access transactions and processes them in parallel. Processing the memory access transactions in parallel is in contrast to serial processing in which each memory access transaction finishes prior to the next memory access transaction being dispatched to the shared memory. Processing the memory access transactions in parallel means that portions of two or more of the memory access transactions may be dispatched to the shared memory concurrently. That is, even though a first memory access transaction has not yet finished, a portion of a second memory access transaction may be dispatched to the shared memory 110.

In processing the memory access transactions, transaction scanner 210 divides, or breaks, each memory access transaction into its respective beat-level memory access commands. Beat-level commands (REQ) are then passed along to an appropriate command arbiter 230 within command super-arbiter 220 according to the address in physical memory blocks 250-1 through 250-N. Thus, for each memory access transaction (e.g., read or write) received by the transaction scanner 210, the transaction scanner 210 may output more than one beat-level memory access command (REQ). Also, note that the beat-level memory access commands associated with a given memory access transaction may be passed to different command arbiters 230. For example, one of the beat-level read commands for a read transaction may be sent to command arbiter 230-1, another to command arbiter 230-2, etc.

As stated above, each command arbiter 230 may correspond to one of the physical memory blocks. For example, each command arbiter 230 may control arbitration for one of the shared memory blocks 250. The physical memory blocks 250-1 through 250-N are one embodiment of shared memory 110. The physical memory blocks 250-1 through 250-N are physical memory banks, in one embodiment. The physical memory blocks 250 are interleaved physical memory banks, in one embodiment. The physical memory blocks 250 are linearly addressed memory banks, in one embodiment. The physical memory blocks 250-1 through 250-N may have the same data width or different data widths. The data width refers to the width of an interface (e.g., data bus) to the physical memory block 250. The data width of a physical memory block corresponds to the beat size for that physical memory block, in one embodiment. This means that different memory blocks 250 could have different beat sizes. Therefore, when the transaction scanner 210 divides each memory access transaction into its respective beat-level memory access commands, it breaks the memory access transaction into beats of appropriate size depending on which physical memory block 250 the command arbiter 230 corresponds to.

Each of command arbiters 230-1 through 230-N is coupled to transaction scanner 210 and is configured to arbitrate beat-level memory access commands according to one or more criteria. Example criterion include, but are not limited to, priority assigned to the transaction associated with the beat-level memory access command, how many clock cycles the beat-level memory access command has been waiting to be dispatched to the shared memory, how critical the beat-level memory access command is, a timing budget for the transaction, shared memory bandwidth allocation for a mode associated with the transaction. Any combination of these criteria, or other criteria, could be used.

Each command arbiter 230 may assign a scheduling weight to each of the beat-level memory access commands that it processes. Beat-level memory access commands having a higher scheduling weight may be dispatched to the shared memory 110 before those having a lower scheduling weight. Each command arbiter 230 may order the beat-level memory access commands that it processes into a sequence (SEQ) of beat-level memory access commands for its physical memory block 250. For example, command arbiter 230-1 may order the beat-level memory access commands that it processes into a sequence of beat-level memory access commands for physical memory block 250-1. Each command arbiter 230 may send the sequence (SEQ) to the combiner 240, which may handle the actual dispatch of the appropriate beat-level memory access command to the physical memory blocks 250. The arbitration may be carried out among command arbiters 230-1 through 230-N in parallel.

Read data/write response combiner 240 is coupled to physical memory blocks 250-1 through 250-N as well as command super-arbiter 220 and transaction scanner 210. In carrying out a beat-level write command, a write address (WA) and write data (WAD) are dispatched to the appropriate physical memory block. The physical memory block returns a beat-level write response (BWR) to the write response combiner 240 to confirm the beat-level write command was served. Rather than passing each beat-level response back to the originating processor in a write transaction response (WTR), read data/write response combiner 240 may collect the beat-level write responses and combine them into a single write response (WRESP) for the transaction, which may be sent to the transaction scanner 210. The single write response may then be passed back to the processor that commanded the transaction in a write transaction response (WTR).

In carrying out a beat-level read command, a read address (RA) is dispatched to the appropriate physical memory block and the read data (BRD) for that beat is returned. Read data/write response combiner 240 may collect the various beat-level read data (BRD) from the physical memory blocks and combine it into a read data response (RD) for the transaction, which may be sent to the transaction scanner 210. The read data response (RD) may then passed back to the processor that commanded the transaction in a read transaction response (RTR).

In one embodiment, the read data/write response combiner 240 does not wait for all beat-level read data commands for a given transaction to complete prior to sending back a read data response (RD) to the transaction scanner 210 in a read transaction response (RTR). This allows the shared memory controller 120 to send a read response to the master prior to all beat-level read data commands associated with the transaction completing. Therefore, the master can receive the more (or most) critical read data faster.

The supervisor 260 receives configuration information pertaining to a particular master and uses that to configure how transactions for that master will be arbitrated by the shared memory controller 120. The configuration information may be provided in a configuration interface. For example, software executing on a processor on the SoC could provide the configuration information to the supervisor 260. The supervisor 260 is coupled to the transaction scanner 210, the command super-arbiter 220 and the combiner 240 in order to configure how those elements process transactions from each master. Note that the configuration information for a given master can be dynamic. For example, over time the configuration information may be updated via the configuration interface. Also, the master could update the configuration information based on operating conditions. Thus, the configuration information can be different for different transactions associated with the same master.

The configuration information may pertain to a QoS of a master. For example, the configuration information may specify whether memory access transactions for the master should be treated as timing sensitive or bandwidth sensitive. A timing sensitive example is a portion of the requested data being more critical than other portions. For example, a CPU may first perform an L1 cache lookup for one word of data, which results in a cache miss. The CPU may then send a transaction requesting eight words of data from the shared memory 110 to fill the entire cache line. The CPU may not actually need the other seven words of data right away in this example, but the CPU makes the request for eight words to comply with a CPU cache fill policy. In this example, the word associated with the cache miss may be referred to as "the most critical word." In one embodiment, the shared memory controller 120 arbitrates beat-level read commands in a way that provides the most critical word faster than other words in the transaction. For example, the shared memory controller 120 could send back the most critical word to the CPU before all of the data associated with the transaction has even been accessed from the shared memory 110. A bandwidth sensitive example is a master simply wanting to get all of the data associated with the transaction as soon as possible.

Another example of configuration information pertaining to QoS is a timing budget for a transaction. In one embodiment, the shared memory controller 120 escalates the priority of a beat-level memory access command to help the transaction meet a timing budget.

Another example of configuration information pertaining to QoS is bandwidth allocation information. Each master may be assigned a different mode. For example, in a wireless domain, there may be a Universal Mobile Telecommunications System (UMTS) mode, Long-Term Evolution (LTE) mode, Global System for Mobile Communications (GSM) mode, etc. Each mode may be allocated a certain bandwidth with respect to access of the shared memory 110. For example, mode A may be allocated 62 percent of the bandwidth, mode B may be allocated 31 percent of the bandwidth, and mode C may be allocated 7 percent of the bandwidth. In one embodiment, the shared memory controller 120 throttles beat-level memory access commands based on the mode of the master that sent the transaction associated with the beat-level memory access command.

Note that QoS information may also be accessed by the shared memory controller 120 in sideband information associated with a transaction. For example, a priority, a timing budget, a bandwidth allocation, mode that indicates bandwidth allocation, etc. could be provided in sideband information from a master. Referring back to FIG. 1, the sideband information might be sent over the interconnect 135. The sideband information may be sent separately from the transactions.

QoS information could also be sent as a part of the transaction. For example, there may be a field within a transaction that specifies the priority of this particular transaction. This could be two or three bits, for example, that indicate how important this transaction is.

In one embodiment, the command super-arbiter 220 uses different scheduling weighting schemes depending on the configuration information. For example, one scheme might factor in the priority of the transaction and how long a beat-level memory access command has been waiting. Another scheme might factor in the priority of the transaction, how long a beat-level memory access command has been waiting, and how critical each beat-level memory access command in the transaction is. Still other schemes could be used. Moreover, the scheduling weighting scheme for a processor can be dynamically calculated and adjusted.

Figure 3:
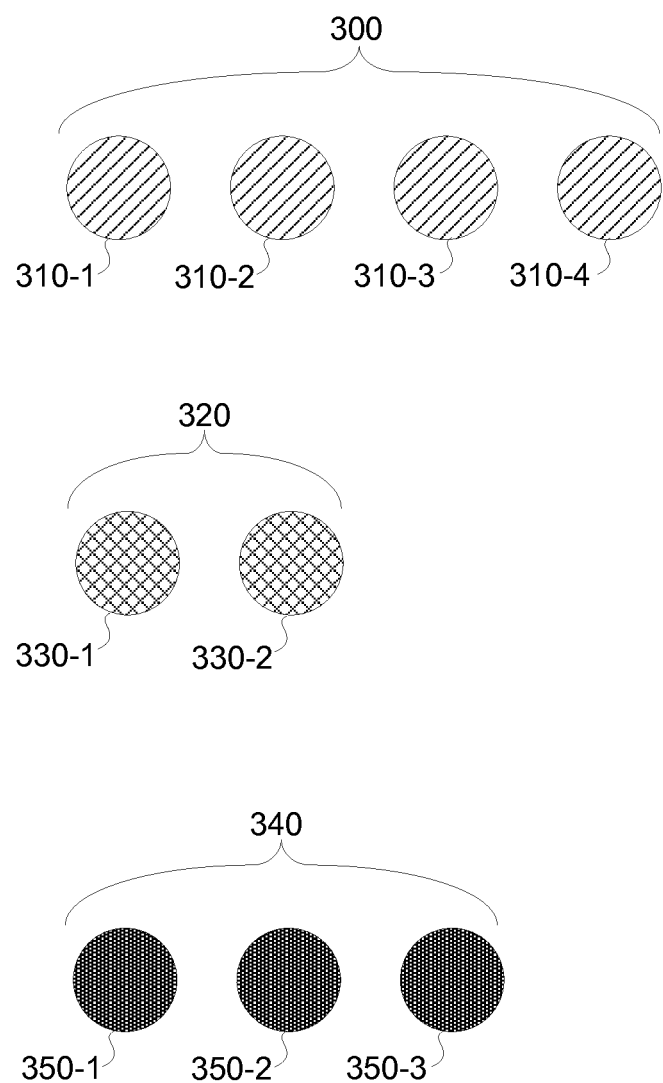
FIG. 3 is an illustration of three shared memory transactions.

FIG. 3 is an illustration of three shared memory transactions, transaction 300, transaction 320, and transaction 340. Transaction 300 includes four beats, beats 310-1 through 310-4. Transaction 320 includes two beats, beats 330-1 and 330-2. Transaction 340 includes three beats, beats 350-1, 350-2, and 350-3.

Figure 4:
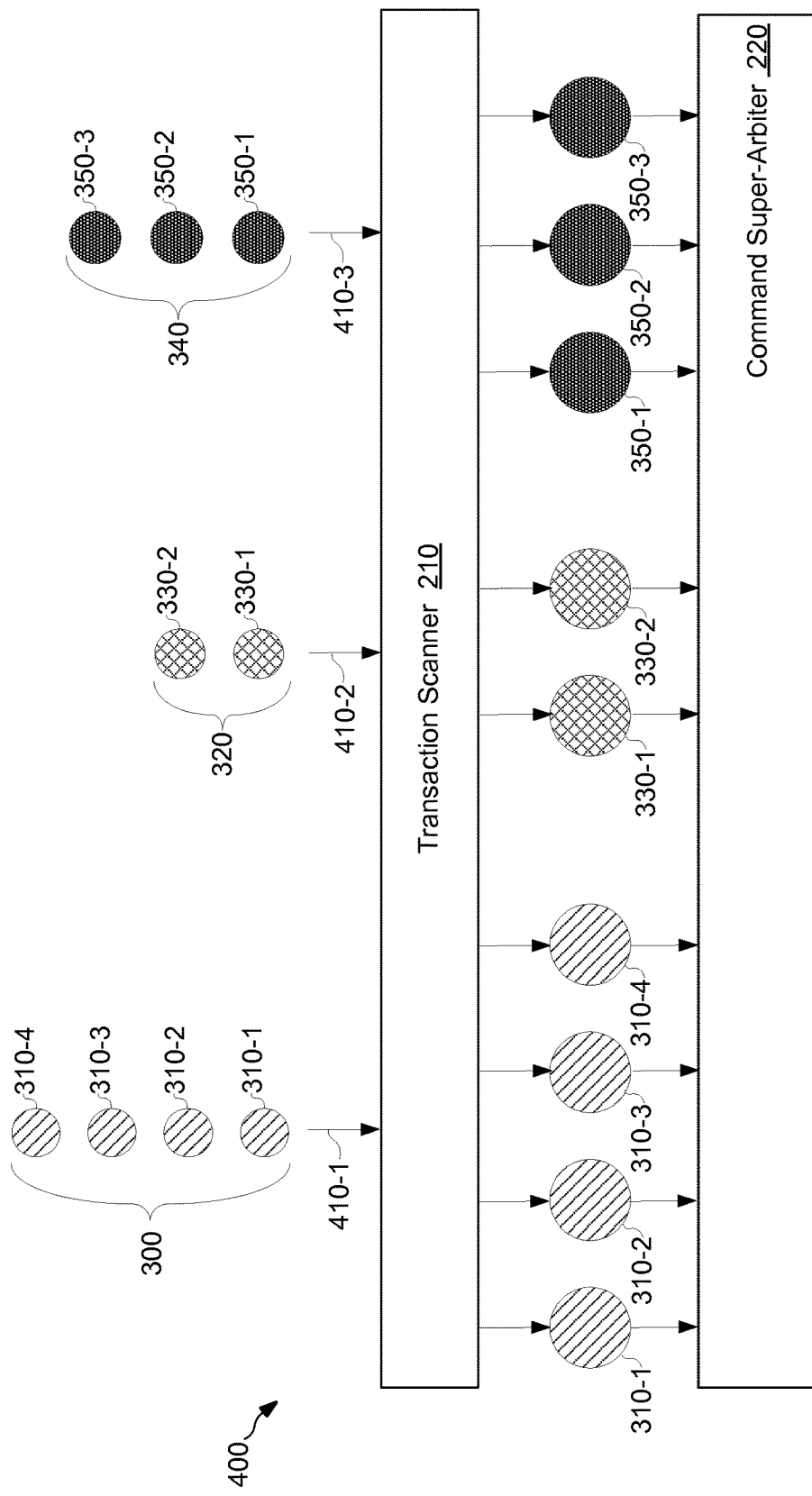
FIG. 4 is an illustration of the shared memory transactions of FIG. 3 flowing through an embodiment of a controller for a shared memory.

FIG. 4 is an illustration of the shared memory transactions of FIG. 3 flowing through an embodiment of a controller 400 for a shared memory. Controller 400 includes transaction scanner 210 and command super-arbiter 220 of FIG. 2. Transaction 300, transaction 320, and transaction 340 may arrive simultaneously at transaction scanner 210 in the form of three corresponding read/write transactions: a transaction 410-1, a transaction 410-2, and a transaction 410-3. In this example, the three memory access transactions are sent by three different masters. Transaction scanner 210 concurrently scans in the three read/write transactions and divides each into its respective beat-level memory access commands. Transaction scanner 210 divides transaction 300 into beats 310-1 through 310-4, transaction 320 into beats 330-1 and 330-2, and transaction 340 into beats 350-1, 350-2, and 350-3.

The beat-level commands are then passed to command super-arbiter 220. In some embodiments, transaction scanner 210 is connected to command super-arbiter 220 by direct connections, while in other embodiments they are connected by an interconnect such as a switching fabric, packet network, etc. Each of the beat-level memory access commands passes to a command arbiter according to its destination memory address. The command arbiters then determine the sequence in which the beat-level memory access commands are to be dispatched to the various physical memory blocks to which controller 400 is coupled. The sequence is determined according to an arbitration scheme for each of transactions 300, 320, and 340, in one embodiment.

Figure 5:
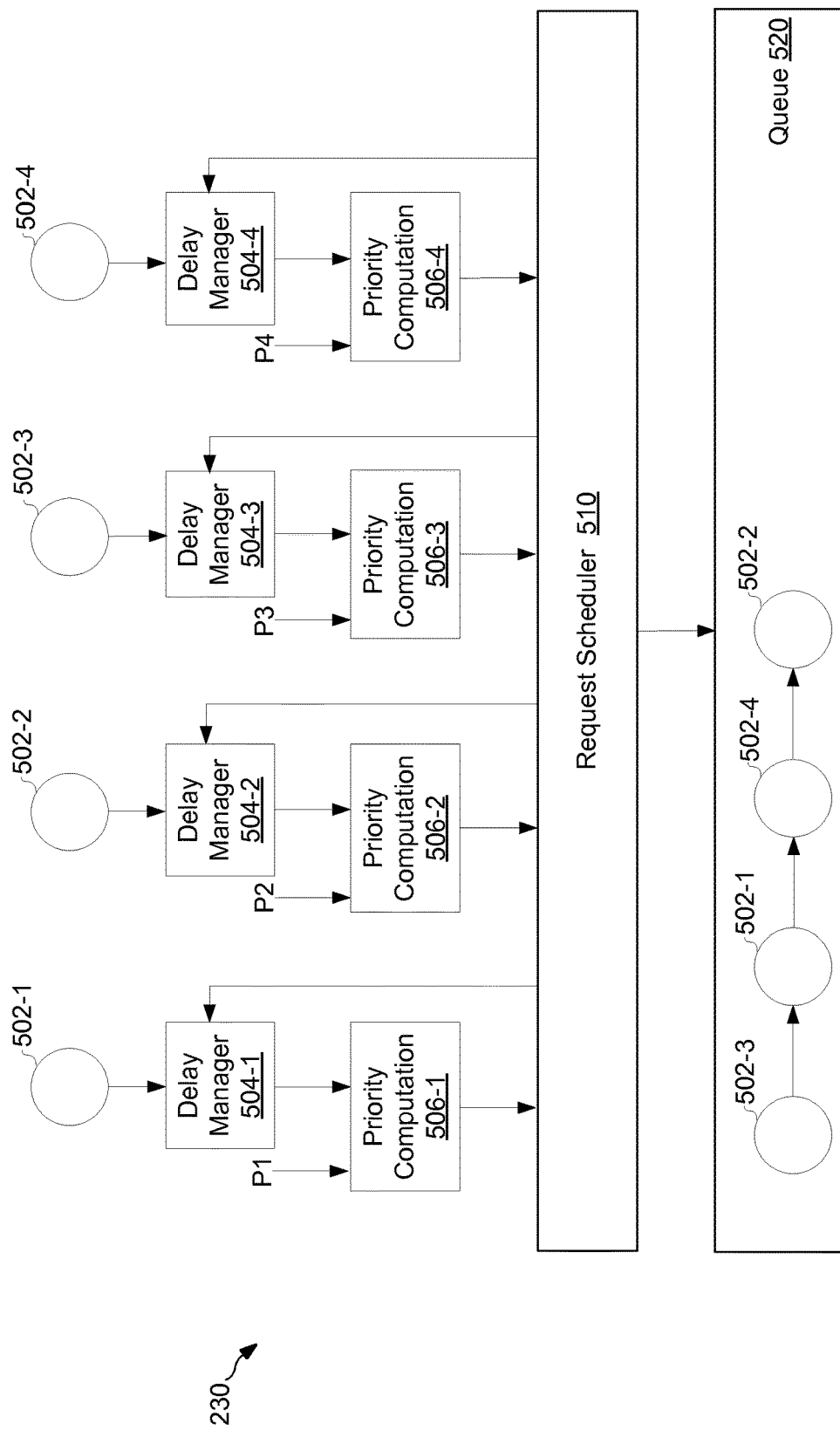
FIG. 5 is diagram of one embodiment of a command arbiter.

FIG. 5 is diagram of one embodiment of a command arbiter 230 of FIG. 2. The command arbiter 230 may schedule beat-level memory access commands for one physical memory block 250. The command arbiter 230 schedules beat-level memory access commands 502-1 through 502-4, in this example. The four beat-level memory access commands 502-1 through 502-4 represent beat-level memory access commands that have yet to be dispatched to the shared memory 110. It is possible, although not required, that each of the beat-level memory access commands 502-1 through 502-4 is associated with a different transaction. At any point in time, there may be more or fewer than four beat-level memory access commands being scheduled by the command arbiter 230.

The command arbiter 230 comprises delay managers 504-1 through 504-4, priority computations 506-1 through 506-4, request schedulers 510, and queue 520. The delay managers 504-1 through 504-4, priority computations 506-1 through 506-4, and request scheduler 510 may be implemented by logic including, but not limited to, registers and/or combinational logic.

In this embodiment, the command arbiter 230 assigns a scheduling weight to each beat-level memory access command based on a delay and a priority. For example, delay manager 504-1 and priority computation 506-1 determine a scheduling weight for beat-level memory access command 502-1. The other delay managers 504-2 through 504-4 and priority computations 506-2 through 506-4 assigns a scheduling weight to the beat-level memory access commands 502-2 through 502-4. The command arbiter 230 assigns a new scheduling weight each clock cycle to any beat-level memory access command that has yet to be dispatched to the shared memory, in one embodiment.

The delay is how many clock cycles the beat-level memory access command has been waiting at the command arbiter 230 to be dispatched to the shared memory, in one embodiment. The priority is a priority of the transaction associated with the beat-level memory access command, in one embodiment. There are many ways in which the command arbiter 230 can factor in these two parameters. One example is shown in Equation 1.

$$W = a^{\left(\frac{d}{b}+p\right)} \quad (1)$$

In Equation 1, "W" is the scheduling weight for the beat-level memory access command, "d" is the delay experienced by the beat-level memory access command in clock cycles, and "p" is the priority of the transaction associated with the beat-level memory access command. The priority may be provided as a few bits of information in the transaction. The priority could be a value between 1 and 16, using a four bit example. In Equation 1, a higher priority is expressed as a higher value. In one embodiment, "p" is based on the priority of the transaction associated with the beat-level memory access command, but could change over time. An example of this is discussed below with respect to Equation 2.

In Equation 1, the delay is divided by a scaling factor "b", which is a constant. The scaling factor may be a power of two, which makes for an efficient computation, as the division can be performed by a shift. As examples, "b" could be 4, 8, 16, 32, etc. Other powers of two may also be used. However, it is not required that the delay in clock cycles be divided by some power of two. Also, the delay could be expressed in a manner other than clock cycles. In Equation 1, "a" also a constant. As one example, "a" is 2. However, "a" could have another value.

In one embodiment, the delay manager 504 and the priority computation 506 perform the calculation of Equation 1. To do so, the delay manager 504 may keep track of the number of clock cycles that the beat-level memory access command it is processing has been waiting to be dispatched to the shared memory. The priority computations 506-1 through 506-4 input priorities P1 through P4, which may be the priorities of the transactions associated with the respective beat-level memory access commands.

Based on the scheduling weight for each beat-level memory access command 502, the request scheduler 510 forms a queue 520. The queue 520 represents the order in which the beat-level memory access commands are to be dispatched to the physical memory block 250 associated with this command arbiter 230. Note that the latency-aware factor represented by, for example, Equation 1 prevents a beat-level memory access command from being stuck on the queue 520. For example, even if beat-level memory access commands whose associated transactions have a higher priority keep being put on the queue, a beat-level memory access command whose associated transaction has a lower priority may in effect be promoted to a higher position in the queue in response to the wait to be dispatched to the shared memory increasing.

Note that over time, the scheduling weight of a beat-level memory access command 502 can change due to the delay value changing. The request scheduler 510 feeds back information to the delay manager 504 so that the delay manager knows whether its beat-level memory access command has been dispatched. Thus, so long as its beat-level memory access command has not been dispatched, the delay manager 504 may increment the delay each clock cycle and output a new delay value to the priority computation 506. Sometimes, the scheduling weight might reach a maximum value. In this case, the scheduling priority may be based on the order in which the beat-level memory access command reach the maximum value.

In one embodiment, the priority of a beat-level memory access command can change as the beat-level memory access command waits to be dispatched to the shared memory 110. This may be done to help meet a timing budget for the transaction, as one example. Equation 2 provides one example of having the priority for a beat-level memory access command be a function of the delay.

$$p = f(t-d) \quad (2)$$

In Equation 2, "t" represent a parameter for a timing budget for the transaction associated with the beat-level memory access command. Again, "d" represents the delay for the beat-level memory access command in, for example, clock cycles. In Equation 2, "f" represents some function that is applied to the parameters t and d. The interpretation of Equation 2 is that the smaller "t-d" is, the larger "p" is. This indicates that as the delay increases, the priority (p) increases. This can help all of the beat-level memory access commands for a transaction to meet the timing budget for that transaction.

In one embodiment, the values P1 through P4 that are fed into the priority computation 506-1 through 506-4 are calculated by the respective delay managers 504-1 through 504-4 based on Equation 2. Other implementations may be used to modify the priority of the transaction based on a timing budget.

Figure 6:
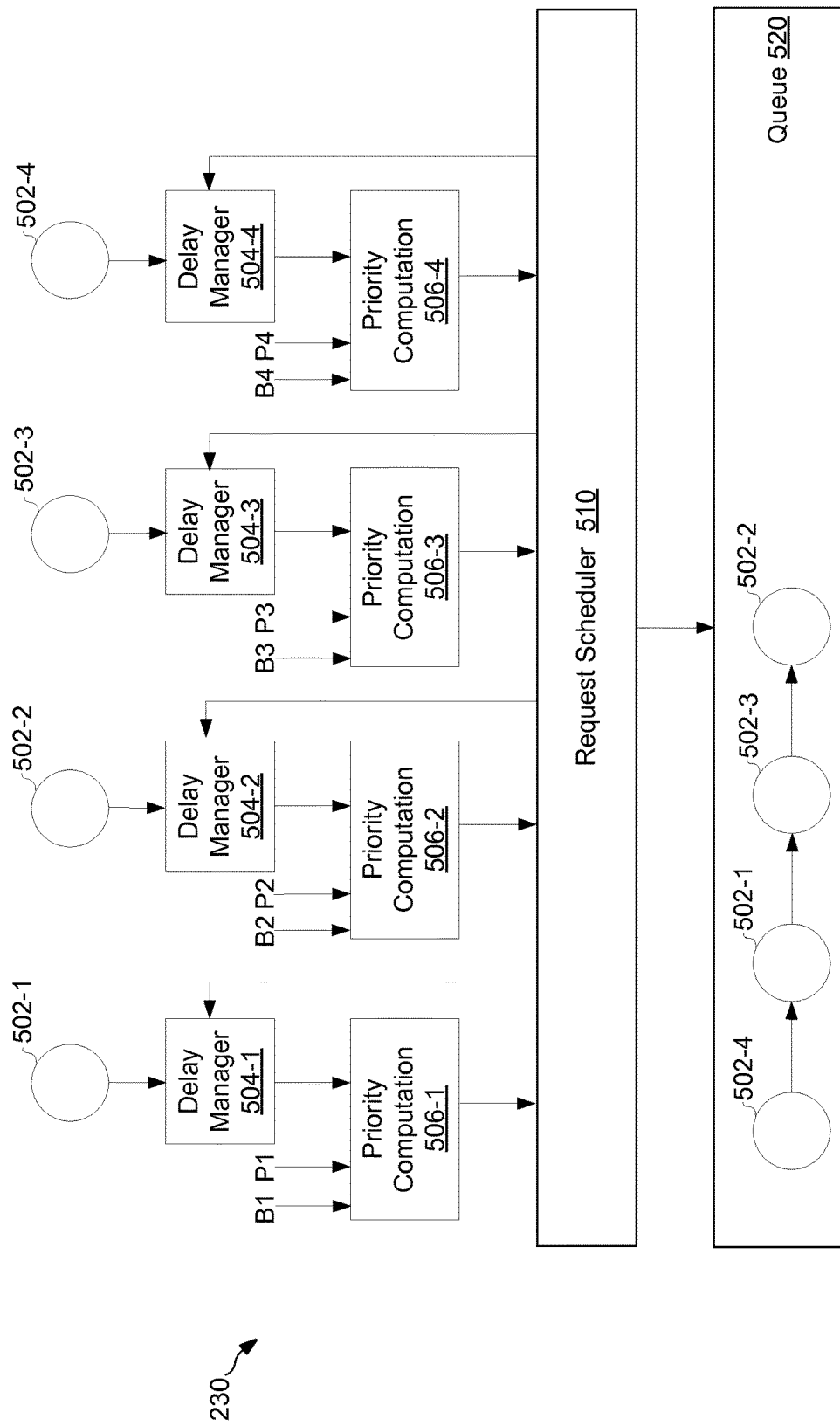
FIG. 6 is diagram of another embodiment of a command arbiter.

FIG. 6 is diagram of another embodiment of a command arbiter 230 of FIG. 2. This embodiment is similar to one embodiment of the command arbiter 230 of FIG. 5, but adds in beat-level priority information. For example, priority computations 506-1 through 506-4 input beat-level priority information B1 through B4. This allows the command arbiter 230 to be latency sensitive to a critical portion of the transaction. For example, the command arbiter 230 may be critical beat latency sensitive.

In one embodiment, the command arbiter 230 assigns a scheduling weight to each beat-level memory access command based on a delay of the each beat-level memory access command, a priority of the transaction associated with the beat-level memory access command, and how critical the beat-level memory access command is to the transaction.

As in the example of FIG. 5, the delay may be how many clock cycles the beat-level memory access command has been waiting at the command arbiter 230 to be dispatched to he shared memory, in one embodiment.

There are many ways in which the command arbiter 230 can factor in these three parameters. One example is shown in Equation 3.

$$W = \text{beat\_priority} * \frac{d}{c} * p \quad (3)$$

In Equation 3, "W" is the scheduling weight for the beat-level memory access command, "d" is the delay experienced by the beat-level memory access command in clock cycles, and "p" is the priority of the transaction associated with the beat-level memory access command. The priority may be a static value or dynamically adjusted as the beat-level memory access command is waiting to be scheduled, as described above with respect to the Equation 2. In Equation 3, "c" is a scaling factor, which is a constant. This serves a similar role as the scaling factor "b" in Equation 1.

The beat_priority depends on how critical the beat is to the transaction, in one embodiment. The most critical beat receives the highest value for the beat_priority in Equation 3. It is possible, although not required, for each beat in a transaction to have a different beat_priority.

To help assign the beat_priority, each beat in a transaction may be assigned a beat identifier (beat_ID). For example, if there are 16 beats in a transaction, they may be ordered from beat_ID of 0 to 15. As one example, the beats may be ordered in criticality according to the beat_ID with the most critical beat may be assigned a beat_ID of 0. In one embodiment, the beat_priority is a power of two in order to simplify the logic of the computation in Equation 3. For example, beat_ID 0 may be assigned a beat_priority of 8, beat_IDs 1 through 3 may be assigned a beat_priority of 4, beat_IDs 4 through 7 may be assigned a beat_priority of 2, and beat_IDs 8 or higher may be assigned a beat_priority of 1.

In one embodiment, the shared memory controller 120 identifies the most critical beat based on the transaction. For example, the transaction may be the result of an L1 cache miss. In this case, the master might not need all of the data being requested in the transaction. The shared memory controller 120 may assign a beat_ID of 0 to the beat associated with the cache miss. The other beats could be assigned beat_IDs based on their addresses in the shared memory. For example, as the addresses increase, the beat_IDs increase. However, note that the most critical beat is not necessarily the one with the lowest address. Therefore, after the beat with the highest address, the beat with the lowest address can be assigned the next beat_ID. The pattern of higher beat_IDs for progressively higher addresses can then be resumed until all beats have been assigned a beat_ID.

The master could signal which beat is the most critical beat by providing information in the transaction. For example, the master may indicate which portion of the transaction is associated with the cache miss. However, other techniques can be used for the shared memory controller 120 to determine the most critical beat.

Note that the priority in Equation 3 can be adjusted to meet a timing budget, as was discussed with respect to Equation 2. Recall that Equation 2 indicates that as the delay increases, the priority (p) increases. This can help all of the beat-level memory access commands for a transaction to meet the timing budget for that transaction.

Figure 7:
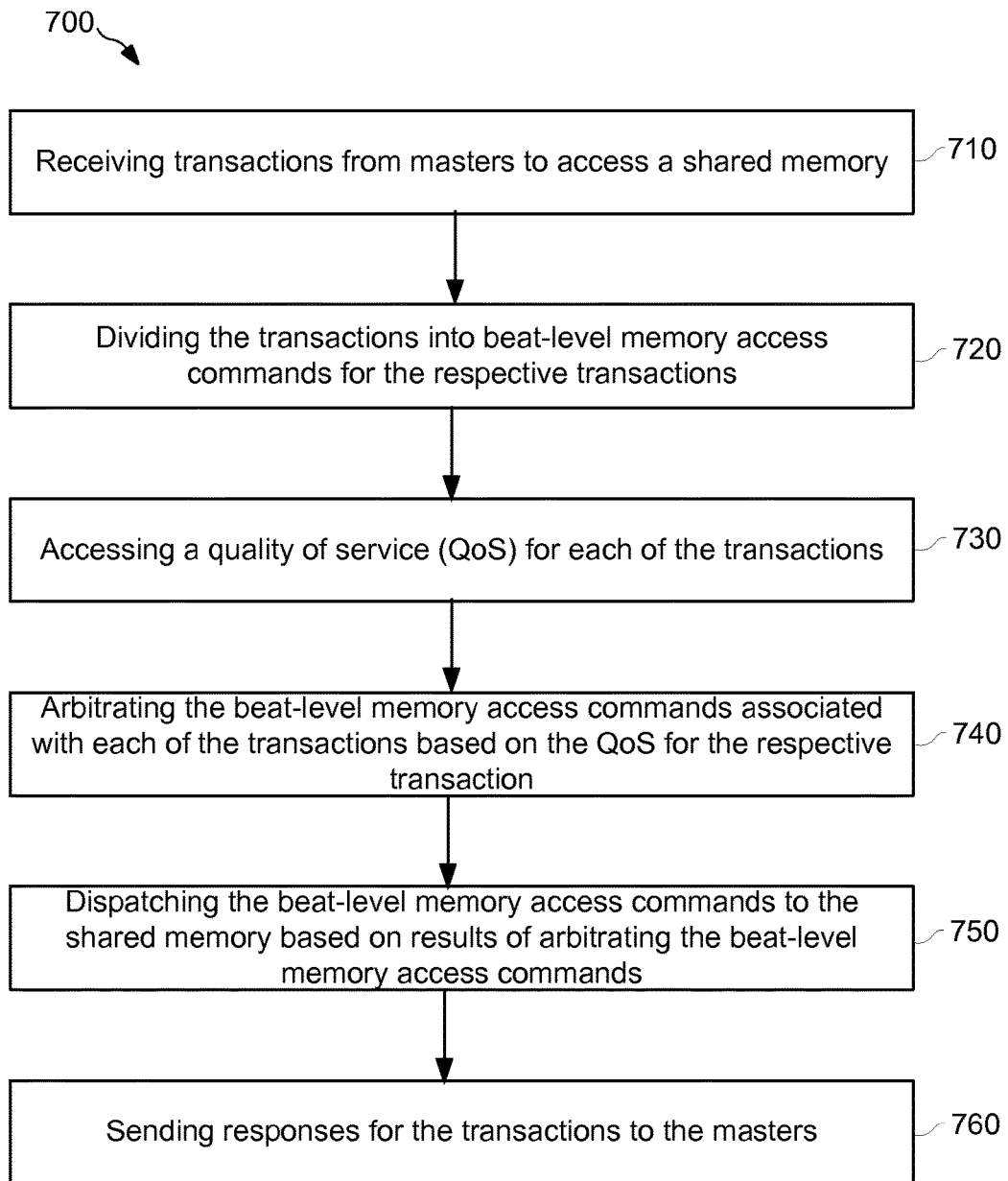
FIG. 7 is a flowchart of one embodiment of a method of controlling a shared memory.

FIG. 7 a flow diagram of one embodiment of a process 700 of controlling a shared memory. The method is performed by one embodiment of a shared memory controller 120. Various steps of the method may be performed by the shared memory controller 120 of FIG. 1 or 2, as well as the command arbiters 230 of FIGS. 5 and 6. Thus, reference will be made to elements in those Figures when discussing FIG. 7. However, the method of FIG. 7 is not limited to the shared memory controller 120 of FIG. 1 or 2, or to the command arbiters 230 of FIG. 5 or 6.

Step 710 includes receiving memory access transactions from masters to access shared memory 110. These transactions are received by the transaction scanner 210, in one embodiment. The memory access transactions are scanned in by the transaction scanner 210 concurrently, in one embodiment. The plurality of memory access transactions can originate from one or more masters such as, for example, a processor core, a processor, a CPU, a DSP, a HAC, etc. Each memory access transaction is divisible into one or more beats, the size of which may depend on the bus width of the interconnect 140 through which the shared memory controller 120 accesses the shared memory 110.

Step 720 includes dividing the memory access transactions into beat-level memory access commands for the transactions. Each of the transactions is divided into at least one beat-level memory access command, and at least one of the transactions is divided into multiple beat-level memory access commands. Potentially, all of the transactions could be divided into multiple beat-level memory access commands. In one embodiment, the transaction scanner 210 performs step 720. Each of the beat-level memory access commands is destined for a particular address in the shared memory 110. For a given transaction, the shared memory address for each beat-level memory access command can vary. The given transaction can cause data to be written to or read from multiple physical blocks of the shared memory.

Step 730 includes accessing a QoS for each of the transactions. Step 730 includes, but is not limited to, the command super-arbiter 220 receiving, determining, or reading the QoS for the transactions. Note that in some cases, this may amount to accessing a QoS for the master that sent the transaction. For example, sometimes the QoS for a master does not change, or changes infrequently. However, in some cases, the QoS can vary from one transaction to the next for a given master.

The QoS could be accessed from configuration information, sideband information in the transaction, or otherwise. Step 730 may include the supervisor 260 providing stored configuration information to any of the transaction scanner 210, the command super-arbiter 220 or the combiner 240. Step 730 may include accessing information from the transaction itself. For example, the transaction may contain priority bits. Step 730 may include accessing out of band information from the master. The out of band information could be received over one of the interconnects 135-1 through 135-6 from the master.

Step 740 includes arbitrating the beat-level memory access commands associated with each of the transactions based on QoS for the respective transaction. In one embodiment, step 740 includes selecting an arbitration scheme based on the QoS for each of the transactions. Step 740 results in arbitrating the beat-level memory access commands in a manner that is aware of a QoS for the master that sent the transaction and/or a QoS for the transaction itself. That is, different transactions for a given master can have the same or different QoS.

The beat-level memory access commands may be concurrently arbitrated at arbitration step 740. Arbitration may be carried out for each physical block of the shared memory in parallel, via the command arbiters 230 corresponding to the physical blocks 250 of shared memory 110. A command arbiter 230 can have a read arbiter and a write arbiter, allowing for independent arbitration of beat-level read commands and beat-level write commands. Arbitration may be carried out concurrently per physical block 250 of shared memory 110 to determine a sequence of beat-level memory access commands according to arbitration policies of their respective transactions.

Step 750 includes dispatching the beat-level memory access commands to the shared memory 110 based on result of the arbitration step 740. Note that the beat-level memory access commands for a given transaction may be dispatched to different physical memory blocks 250. Thus, the beat-level memory access commands for a given transaction may be on a different scheduling queue. This allows for, but does not require, parallel dispatch (as well as parallel execution) of the beat-level memory access commands of a given transaction.

At step 760, the shared memory controller 120 may return responses to the transactions back to the masters. This may include a combining step. The combining step may consolidate data and responses for respective read transactions. Likewise, the combining step may consolidate responses for respective write transactions.

During a read transaction, at the combining step, the beat-level read data may be collected from the various physical blocks 250 of shared memory 110. Once all the read data for the corresponding transaction is collected, a single read data response may be passed back toward the master. In one embodiment, the shared memory controller 120 does not wait for all of the read data from the various beat-level memory access commands to complete before beginning to send the response to the master. For example, read data for the more (or most) critical beat may be sent to the master prior to other beats completing.

During a write transaction, the various physical blocks 250 of shared memory 110 generate beat-level write responses to confirm the beat-level write command has been served. At the combining step, the beat-level write responses may be collected from various physical blocks 250 of shared memory 110, and a single write response may be passed back toward the master.

Figure 8:
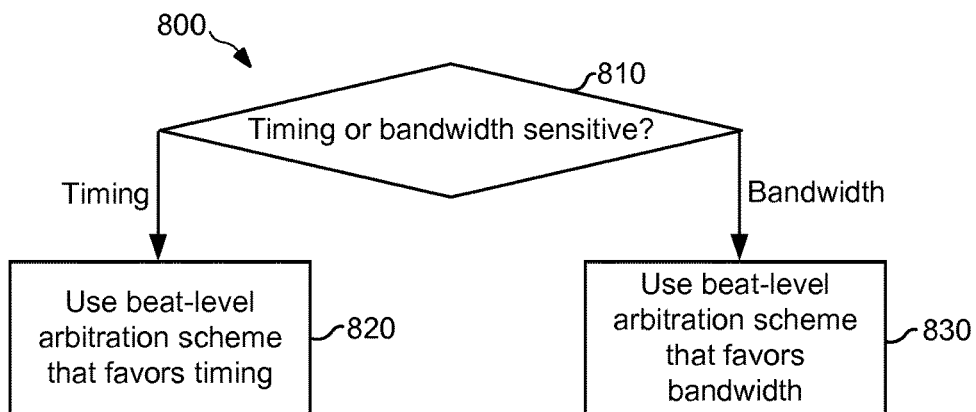
FIG. 8 is a flowchart of one embodiment of a method of arbitrating beat-level memory access commands based on QoS for the respective transaction.

FIG. 8 is a flowchart of one embodiment of a process 800 of arbitrating the beat-level memory access commands based on QoS for the respective transaction. The process is performed by one embodiment of a shared memory controller 120. This is one embodiment of step 740 from FIG. 7. In step 810, the shared memory controller 120 determines whether the transaction is timing sensitive or bandwidth sensitive. Timing sensitive means that a certain portion of the transaction should be processed by the shared memory faster even at the expense of other portions of the transaction being processed by the shared memory more slowly. Bandwidth sensitive means that the entire transaction should be processed by the shared memory quickly without given priority to one portion of the transaction.

As one example, a CPU may be timing sensitive in that it cares most about receiving a certain portion of the read data from a transaction as fast as possible. The CPU may not care about a delay in receiving all of the read data for a given transaction. This may be the case when the CPU requests a cache line from L2 shared memory in response to an L1 cache miss. A bandwidth sensitive example is that a processor simply wants to get all of the data associated with the transaction as soon as possible. This may be the case for a processor performing a rendering application, but many other examples exist. The determination of step 810 may be based on configuration information for the respective masters that is stored by the supervisor 260.

Based on the determination of step 810, the shared memory controller 120 either performs beat-level arbitration that favors timing (step 820) or beat-level arbitration that favors bandwidth (step 830). One example of beat-level arbitration that favors timing is provided in Equation 3. Note that Equation 3, is critical beat sensitive. Thus, step 820 may include using a scheduling weighting scheme that favors dispatching a most critical beat-level memory access command for the transaction over dispatching all beat-level memory access commands for the transaction. Step 820 may include using a scheduling weighting scheme that provides a higher scheduling weight the more critical the beat-level memory access command is to the transaction. This may include giving the most critical beat-level memory access command the highest scheduling weight.

In one embodiment, step 820 includes assigning different scheduling weights to two beat-level memory access commands associated with the same transaction. This may allow the various beat-level memory access commands in a given transaction to be dispatched to the shared memory faster or slower than the others. As one example, step 820 includes assigning different scheduling weights to two beat-level memory access commands associated with the same transaction based on how critical the respective two beat-level memory access commands are to the transaction. Stated another way, the shared memory controller assigns different scheduling weights to two beat-level memory access commands associated with the same transaction based on how critical the respective two beat-level memory access commands are to the master.

One example beat-level arbitration that favors bandwidth is provided in Equation 1. Thus, in step 830, beat-level arbitration may be based on Equation 1. Note that Equation 1, is latency sensitive in that it factors in how long a given beat-level memory access command has been waiting to be dispatched to the shared memory. Thus, that technique helps to avoid starvation. It also helps to increase bandwidth. Thus, step 830 may include using a scheduling weighting scheme that favors dispatching all of the beat-level memory access commands for the transaction quickly. Step 830 may include using a scheduling weighting scheme that gives the same scheduling weight to the all of the beat-level memory access commands in the transaction. In one embodiment, step 830 includes using a scheduling weighting scheme that treats all of the beat-level memory access commands for the transaction equally.

Figure 9:
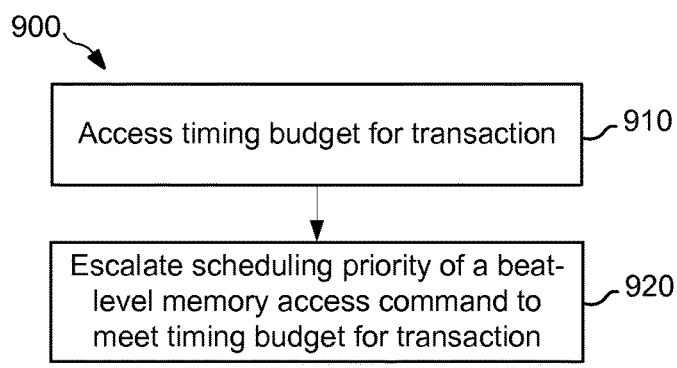
FIG. 9 is a flowchart of one embodiment of a process of accessing a QoS for a transaction and arbitrating the beat-level memory access commands associated with the transactions based on the QoS.

FIG. 9 is a flowchart of one embodiment of a process 900 of accessing a QoS for a transaction and arbitrating the beat-level memory access commands associated with each of the transactions based on the QoS. This is one embodiment of steps 730 and 740 from FIG. 7.

In step 910, the shared memory controller 120 accesses a timing budget for the transaction. The timing budget may be specified in the configuration information for the master that is stored by the supervisor 260. The timing budget could also be supplied in sideband information that is supplied from the master to the shared memory controller 120.

In step 920, the command arbiters 230 that are processing the beat-level memory access commands for the transaction escalate the scheduling priority of the beat-level memory access commands in order to meet the timing budget. Equation 2 shows one example of how a scheduling weight can be calculated to meet a timing budget. Recall that in Equation 2, the priority for the beat-level memory access command is increased the longer that the beat-level memory access command waits to be dispatched to the shared memory. Thus, escalating the scheduling priority may include dynamically changing the priority of the beat-level memory access command.

Figure 10:
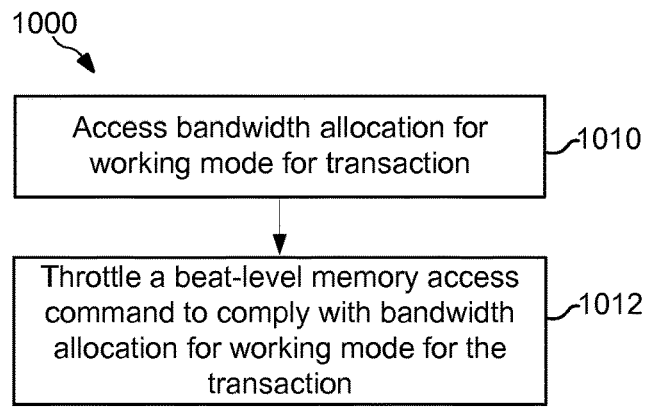
FIG. 10 is a flowchart of another embodiment of a process of accessing a QoS for a transaction and arbitrating the beat-level memory access commands associated with the transactions based on the QoS.

FIG. 10 is a flowchart of one embodiment of a process 1000 of accessing a QoS for a transaction and arbitrating the beat-level memory access commands associated with each of the transactions based on the QoS. This is one embodiment of step 730 and 740 from FIG. 7.

In step 1010, the shared memory controller 120 accesses a bandwidth allocation for a mode for a transaction. For example, in a wireless domain, there may be a Universal Mobile Telecommunications System (UMTS) mode, Long- Term Evolution (LTE) mode, Global System for Mobile Communications (GSM) mode, etc. Each of these modes may have a specified bandwidth allocation. The mode and/or its bandwidth allocation for a master can be specified in the configuration information that is provided to the supervisor 260. This information may be more static than other QoS information since it may be set for a region once a serving area is decided. For example, a SoC deployed in a base station in North America would have higher bandwidth in LTE mode. Note that the modes are not limited to this wireless domain example. It is also possible for the bandwidth allocated to a master to change dynamically.

In step 1012, the shared memory controller 120 throttles a beat-level memory access command to comply with the bandwidth allocation for the mode associated with the transaction. For example, the shared memory controller 120 prevents a beat-level memory access command from being dispatched to the shared memory when beat-level memory access commands associated with the mode for the transaction have exceeded the allocated bandwidth for the mode for the transaction. Note that this helps a group of beat-level memory access commands associated with another mode to receive their allocated bandwidth.

In one embodiment, step 1012 includes the transaction scanner 210 throttling requests to the command super-arbiter 220 based on the configuration information. For example, a request is not sent by the transaction scanner 210 to the command super-arbiter 220 if the bandwidth allocation for the mode associated with the transaction is reached. One example of managing allocation of bandwidth is the following: for every 13 clock cycles, 8 clock cycles will be given to mode 1, 4 clock cycles will be given to mode 2, and 1 clock cycle will be given to mode 3. Thus, mode 1 will have 8/13 bandwidth allocation, mode 2 will have 4/13 bandwidth allocation and mode 3 only has 1/13 bandwidth. If one mode does not have any requests in its slots, this slot could be assigned to other requests associated with other modes.

The bandwidth allocation information may also passed to the command super-arbiter 220 since this can achieve bandwidth allocation at the beat-level. The command super-arbiter 220 can use the same bandwidth allocation used by transaction scanner 210. The command super-arbiter 220 may arbitrate all outstanding requests in the same mode with the format discussed above. Thus, the final effects may be a two level arbitration process. First a test may be made to be sure that the beat-level memory access commands satisfy the bandwidth allocation. Those beat-level memory access commands that do not pass the bandwidth allocation test are throttled. The command super-arbiter 220 may throttle a beat-level memory access command by not putting the beat-level memory access command onto its queue of commands to be dispatched to the shared memory. Thus, arbitration of the beat-level memory access commands may be performed based on the scheduling weights discussed above for all beat-level memory access commands that were not throttled.

Figure 11A:
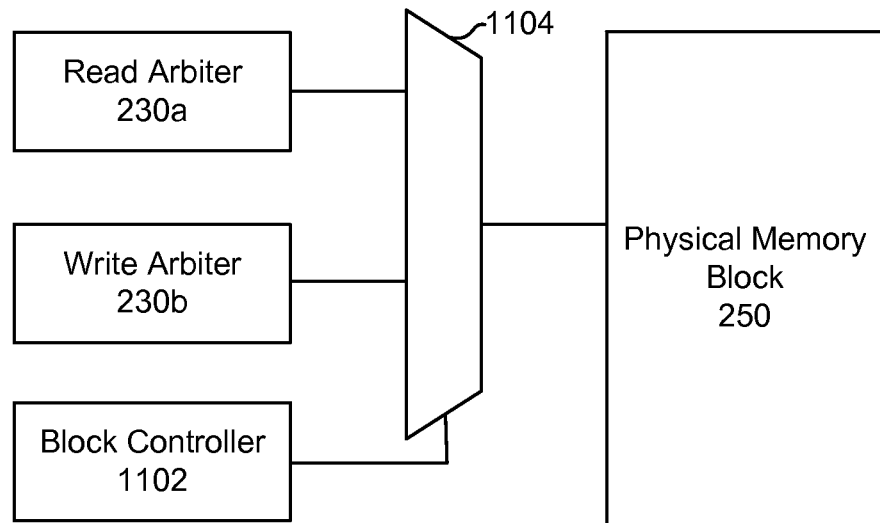
FIG. 11A is a diagram of one embodiment of command arbiters and a block controller coupled to a physical memory block.

FIG. 11A is a diagram of one embodiment of command arbiters and a block controller coupled to a physical memory block. The read arbiter 230a and the write arbiter 230b are one embodiment of a command arbiter 230 in the memory controller of FIG. 2. The block controller 1102 is within one embodiment of the combiner 240. Other elements of the combiner 240 are not depicted in FIG. 11A.

The read arbiter 230a provides one of the beat-level read commands to one input of the multiplexer (MUX) 1104. The write arbiter 230b provides one of the beat-level write commands to another input of the MUX 1104. The block controller 1102 controls the MUX to select either the beat-level read command or the beat-level write command to be dispatched to the physical memory block 250. The physical memory block 250 is a physical memory bank, in one embodiment.

Thus, in the embodiment of FIG. 11A, at one point in time the physical memory block 250 may either be read from or written to. However, the physical memory block 250 is not read from and written to at the same time, in this embodiment.

Figure 11B:
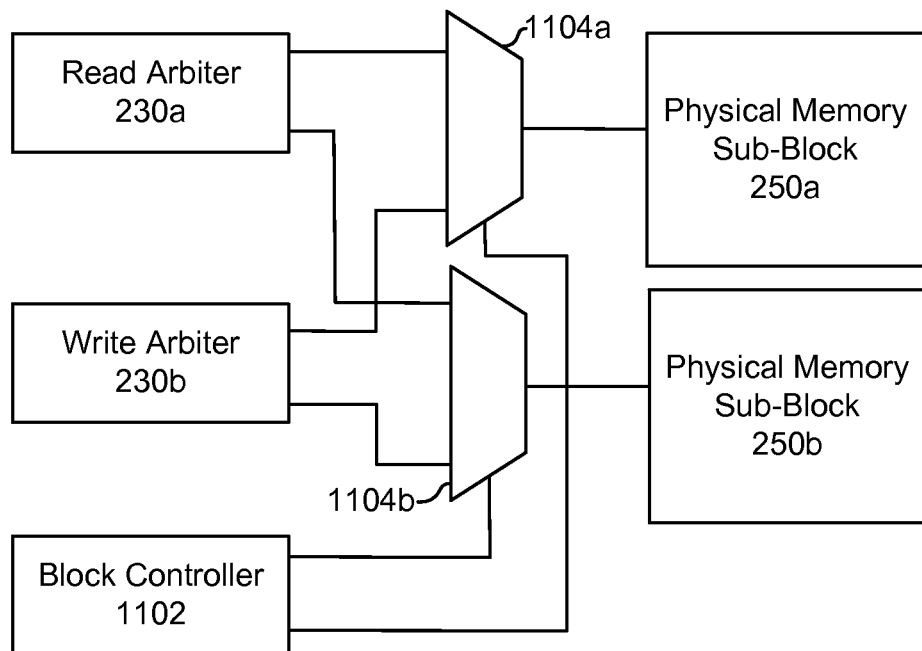
FIG. 11B is a diagram of another embodiment of command arbiters and a block controller coupled to physical memory sub-blocks.

FIG. 11B is a diagram of one embodiment of command arbiters and a block controller coupled to a physical memory sub-blocks. In this embodiment, there are two physical memory sub-blocks 250a, 250b. These sub-blocks 250a, 250b are two distinct regions of the physical memory block 250 of FIG. 11A, in one embodiment. For example, sub-blocks 250a, 250b are different physical parts of the same physical memory bank, in one embodiment. The two sub-blocks 250a, 250b are associated with different memory addresses.

In this embodiment, one beat-level memory access command can be executing in physical memory sub-block 250a, while another beat-level memory access command is executing in physical memory sub-block 250b. For example, a beat-level read command may be executing in physical memory sub-block 250a, while beat-level write command is executing in physical memory sub-block 250b. Alternatively, a beat-level write command may be executing in physical memory sub-block 250a, while a beat-level read command is executing in physical memory sub-block 250b.

The read arbiter 230a provides a beat-level read command to MUX 1104a, and may provide a different beat-level read command to MUX 1104b, depending on the memory addresses associated with the beat-level read commands. The write arbiter 230b provides a beat-level write command to MUX 1104a, and may provide a different beat-level write command to MUX 1104b, depending on the memory addresses associated with the beat-level write commands. The block controller 1102 selects one of the beat-level memory access commands provide to MUX 1104a to be dispatched to physical memory sub-block 250a. The block controller 1102 selects one of the beat-level memory access commands provide to MUX 1104b to be dispatched to physical memory sub-block 250b.

Thus, one embodiment of the shared memory controller is configured to select a beat-level read command from the read arbiter 230a and a beat-level write command from the write arbiter 230b for concurrent execution in the first physical memory block 250a and the second physical memory block 250b, respectively. That is, the beat-level read command executes in the first physical memory block 250a while the beat-level write command executes in the second physical memory block 250b.

Thus, the embodiment of FIG. 11B provides for fine-grain memory banking. Moreover, the memory access commands being dispatched to the physical memory sub-blocks 250a, 250b are at the beat-level. This may provide for further performance improvements.

Fine-grain banking is not limited to two sub-blocks. In one embodiment, a physical memory block is divided into four sub-blocks. In one embodiment, a physical memory block is divided into eight sub-blocks. The physical memory block could be divided into some other number of sub-blocks.

In an example embodiment, a shared memory controller is used to arbitrate beat-level memory access commands. The shared memory controller includes a receiving element that receives a plurality of transactions from a corresponding plurality of masters to access a shared memory, and the divides the plurality of transactions into beat-level memory access commands for the respective transactions. The shared memory controller includes an arbitration element that accesses a quality of service for each of the plurality of transactions, that arbitrates the beat-level memory access commands associated with the transactions based on the quality of service for the respective transactions, and that dispatches the beat-level memory access commands to the shared memory based on results of arbitrating the beat-level memory access commands. In some example embodiments, this shared memory controller may further include one or more elements for performing any one or combination of steps described in the embodiments.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more elements. Each step in a process may be performed by the same or different elements as those used in other steps, and each step need not necessarily be performed by a single element.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    receiving memory access transactions from a plurality of masters to access a shared memory that is accessed by one or more busses, each memory access transaction having a transaction priority;
    dividing each memory access transaction into one or more beat-level memory access commands, each of the beat-level memory access commands associated with an address in the shared memory, each of the beat-level memory access commands having a size that matches a width of the bus used to access the address in the shared memory associated with the beat-level memory access command, including dividing at least two of the memory access transactions into multiple beat-level memory access commands;
    assigning a beat priority to each beat-level memory access command, including assigning a highest beat priority to a most critical beat-level memory access command for each transaction and progressively lower beat priorities to at least two other beat-level memory access commands as the memory addresses associated with the beat-level memory access commands are further from the memory address associated with the most critical beat-level memory access command;
    assigning a weight to each beat level memory access command based on the beat priority for the beat level memory access command, the transaction priority for the transaction associated with the beat level memory access command, and a delay experienced by the beat level memory access command;
    arbitrating between the beat-level memory access commands from different ones of the memory access transactions based on the weights; and
    dispatching the beat-level memory access commands to the shared memory based on results of arbitrating between the beat-level memory access commands.

2. The method of claim 1, wherein arbitrating the beat-level memory access commands further comprises:
    increasing the weight of a first beat-level memory access command of the beat-level memory access commands in response to an increase in the time that the first beat-level memory access command waits to be dispatched to the shared memory.

3. The method of claim 1, further comprising determining whether a first memory access transaction of the plurality of memory access transactions is bandwidth sensitive or timing sensitive.

4. The method of claim 3, wherein arbitrating the beat-level memory access commands further comprises using a first scheduling weighting scheme that favors dispatching the most critical beat-level memory access command for the first memory access transaction over dispatching other beat-level memory access commands for the first memory access transaction if the first memory access transaction is timing sensitive and using a second scheduling weighting scheme that treats all of the beat-level memory access commands for the first memory access transaction equally if the first memory access transaction is bandwidth sensitive.

5. The method of claim 1:
    further comprising accessing a timing budget for a first memory access transaction of the plurality of memory access transactions; and
    wherein arbitrating the beat-level memory access commands further comprises escalating a scheduling priority of a beat-level memory access command associated with the first memory access transaction to meet the timing budget.

6. The method of claim 1:
    further comprising accessing a bandwidth allocation for a mode for a first memory access transaction of the plurality of memory access transactions, wherein the mode is a first mode of a plurality of modes that are each allocated a certain bandwidth with respect to access of the shared memory; and
    wherein arbitrating the beat-level memory access commands further comprises preventing a beat-level memory access command associated with the first memory access transaction from being dispatched to the shared memory when beat-level memory access commands associated with the first mode have exceeded the allocated bandwidth for the first mode.

7. The method of claim 1, wherein arbitrating the beat-level memory access commands further comprises:
    assigning scheduling weights to the beat-level memory access commands associated with the same memory access transaction based on:
    i) how many clock cycles each of the beat-level memory access commands associated with the same memory access transaction has been waiting to be dispatched to the shared memory; and
    ii) the respective beat priority for each of the beat-level memory access commands in the same memory access transaction.

8. The method of claim 1, wherein the beat priorities are powers of two.

9. An apparatus, comprising:
a transaction scanner configured to scan-in a plurality of memory access transactions to access a shared memory and to divide the memory access transactions into beat-level memory access commands, wherein each of the memory access transactions is divisible into at least one beat-level memory access command, and wherein at least one of the memory access transactions is divisible into multiple beat-level memory access commands; and
a command super-arbiter comprising a plurality of command arbiters corresponding to a plurality of shared memory blocks in the shared memory, and configured to:
assign different scheduling weights to two beat-level memory access commands associated with the same memory access transaction based on how critical the respective two beat-level memory access commands are to the memory access transaction;
arbitrate the beat-level memory access commands associated with the plurality of memory access transactions based on the scheduling weights for each of the beat-level memory access commands, including:
i) use a first scheduling weighting scheme that favors dispatching a most critical beat-level memory access command for a given memory access transaction over dispatching other beat-level memory access commands for the given memory access transaction if the given memory access transaction is timing sensitive; and
ii) use a second scheduling weighting scheme that treats all of the beat-level memory access commands for the given memory access transaction equally if the given memory access transaction is bandwidth sensitive; and
dispatch the beat-level memory access commands to the shared memory blocks based on results of arbitrating the beat-level memory access commands.

10. The apparatus of claim 9, wherein a command arbiter of the plurality of command arbiters is configured to:
increase a scheduling weight of a first beat-level memory access command of the beat-level memory access commands as a number of clock cycles the first beat-level memory access command has been waiting to be dispatched to the shared memory blocks increases.

11. The apparatus of claim 9, wherein a command arbiter of the plurality of command arbiters is configured to:
determine whether the given memory access transaction is bandwidth sensitive or timing sensitive.

12. The apparatus of claim 9, wherein a command arbiter of the plurality of command arbiters is configured to access a timing budget for a first memory access transaction of the plurality of memory access transactions; and wherein the command arbiter is configured to escalate a scheduling priority of a beat-level memory access command associated with the first memory access transaction to meet the timing budget.

13. The apparatus of claim 9, wherein the command super-arbiter is configured to access a bandwidth allocation for a mode for respective memory access transactions of the plurality of memory access transactions, wherein the mode is a first mode of a plurality of modes that are each allocated a certain bandwidth with respect to access of the shared memory; and
wherein the command super-arbiter is configured to prevent a beat-level memory access command associated with a first memory access transaction of the plurality of memory access transactions from being dispatched to the shared memory when beat-level memory access commands associated with the first mode have exceeded the allocated bandwidth for the first mode.

14. The apparatus of claim 9, wherein a command arbiter of the plurality of command arbiters comprises a read arbiter and a write arbiter, wherein the shared memory block associated with the command arbiter is divided into a first physical memory block and a second physical memory block, and further comprising a block controller that is configured to select a beat-level read command from the read arbiter and a beat-level write command from the write arbiter for concurrent execution in the first physical memory block and the second physical memory block respectively.

15. A system on a chip (SoC), comprising:
a plurality of shared memory blocks;
a plurality of busses, wherein each bus is associated with one of the shared memory blocks;
a plurality of masters configured to generate a plurality of transactions to access the plurality of shared memory blocks via the plurality of busses, each transaction having a transaction priority; and
a shared memory controller coupled between the plurality of shared memory blocks and the plurality of masters, wherein the shared memory controller comprises a transaction scanner and a plurality of command arbiters corresponding to the plurality of shared memory blocks, wherein the transaction scanner is configured to scan-in and divide the plurality of transactions into beat-level read/write commands, each beat-level read/write command associated with an address in the shared memory blocks, each beat-level read/write command having a size that matches a width of the bus used to access the address in the shared memory blocks associated with the beat-level read/write command, wherein the transaction scanner is configured to divide at least two of the transactions into multiple beat-level read/write commands, wherein the plurality of command arbiters are configured to:
assign a beat priority to each beat-level read/write command, including assign a highest beat priority to a most critical beat-level read/write command for each transaction and progressively lower beat priorities to at least two other beat-level read/write commands as the memory addresses associated with the beat-level read/write commands are further from the most critical beat-level read/write command;
assign a weight to each beat-level read/write command based on the beat priority for the beat-level read/write command, the transaction priority for the transaction associated with the beat-level read/write command, and a delay experienced by the beat-level read/write command;
arbitrate the beat-level read/write commands associated with the transactions based on the weights, yielding sequences of beat-level read/write commands corresponding to the respective plurality of shared memory blocks; and
dispatch the sequences of beat-level read/write commands to the respective plurality of shared memory blocks.

16. The system on a chip (SoC) of claim 15, wherein a first command arbiter of the plurality of command arbiters is configured to generate a first sequence of the sequences of beat-level read/write commands and is configured to dispatch beat-level read/write commands of the first sequence to a first shared memory block of the plurality of shared memory blocks, wherein the plurality of command arbiters configured to arbitrate the beat-level read/write commands associated with the transactions comprises the first command arbiter being configured to:

promote a first beat-level read/write command that is in the first sequence of beat-level read/write commands to a higher position in the first sequence in response to a number of clock cycles the first beat-level read/write command has been waiting to be dispatched to a shared memory block increasing.

17. The system on a chip (SoC) of claim 15, wherein a first command arbiter of the plurality of command arbiters is configured to generate a first sequence of the sequences of beat-level read/write commands and is configured to dispatch beat-level read/write commands of the first sequence to a first shared memory block of the plurality of shared memory blocks, wherein the plurality of command arbiters that are configured to arbitrate the beat-level read/write commands associated with the transactions comprises the first command arbiter configured to:

assign a greater scheduling weight to a first beat-level read/write command associated with a first transaction of the transactions than to other beat-level read/write commands in the first transaction in response to the first beat-level read/write command being more critical to the first transaction than other beat-level read/write commands in the first transaction.

18. The system on a chip (SoC) of claim 15, wherein the plurality of shared memory blocks comprise a corresponding plurality of interleaved physical memory banks.

19. The system on a chip (SoC) of claim 15, wherein the plurality of shared memory blocks comprise a corresponding plurality of linearly addressed memory banks.

20. The system on a chip (SoC) of claim 15, wherein the plurality of shared memory blocks each have a data width, wherein at least two of the plurality of shared memory blocks have different data widths.

* * * * *